Aug. 25, 1925.                J. SLEPIAN                1,551,271
                     REACTION SYNCHRONOUS MOTOR
                        Filed Dec. 2, 1922.

WITNESSES:                                         INVENTOR
                                              Joseph Slepian
                                                    BY
                                                         ATTORNEY

Patented Aug. 25, 1925.

1,551,271

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

REACTION SYNCHRONOUS MOTOR.

Application filed December 2, 1922. Serial No. 604,502.

*To all whom it may concern:*

Be it known that I, JOSEPH SLEPIAN, a citizen of the United States, and a resident of Swissvale, in the county of Allegheny and State of Pennsylvania, have invented a new and useful Improvement in Reaction Synchronous Motors, of which the following is a specification.

My invention relates to reaction synchronous motors and more particularly to rotors used in multiple-pole motors of such type.

The principal object of my invention is to provide a rigidly built rotor capable of starting from rest and of developing a higher torque at synchronous speed than motors know heretofore.

Another object of my invention is to provide a new method of producing the effect of salient poles in a substantially smooth-core construction.

Figure 1:
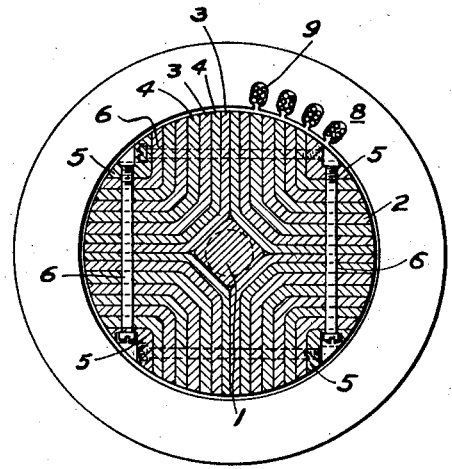
Figure 2:
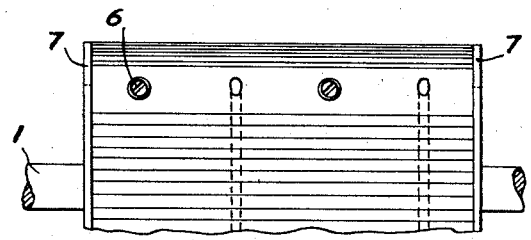
Figure 3:
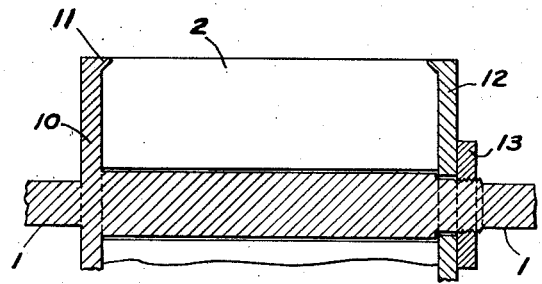

In the accompanying drawing,

Figure 1 is a vertical sectional view of a four-pole synchronous reaction motor, showing a rotor and a stator, Fig. 2 is a side view of a portion of the rotor, and Fig. 3 is a longitudinal section of a portion of a rotor having a modified form of support.

The rotor comprises a shaft 1, the middle portion of which is square in cross-section and four core portions 2. Each of the core portions is composed of alternate angular layers of magnetic material 3 and non-magnetic, but electrically conducting material 4, such as brass. The layers 3 and 4 are successively of lesser width outwardly from the shaft to form a cylindrical core. The four core portions are secured to the shaft by means of segmental-cross-sectioned bars 5 of magnetic material and bolts 6 of non-magnetic material, the bolts projecting through holes in the corresponding bars and the layers of adjoining core portions.

At each end of the core is an end ring 7 of conducting material, such as copper, providing closed circuits for the layers 3 and 4 and giving the effect of a squirrel-cage winding for starting purposes.

The stator 8 is preferably laminated and has a suitable winding 9.

In Fig. 3 is shown a modification of the supporting structure. A flange 10, having an annular inwardly projection portion 11 of wedge shape, is provided on one end of the shaft, and the core portions 2, described above, are pressed between said flange and a ring 12 of similar shape on the other end of the shaft, the latter being held in place by means of a nut 13 which is in threaded engagement with a threaded portion of the shaft 1. The flange 10 and the ring 12 provide also closed circuits for the individual layers of the core and produce the effect of a squirrel-cage winding.

A rotor, constructed as outlined above, has a path of low reluctance along the directions of the angular laminations and high reluctance in electrical quadrature thereto and it acquires, in a magnetic field rotating around its axis, a polar character to a higher degree than any other reaction or salient-pole construction known heretofore. Consequently, a synchronous reaction motor comprising a rotor forming substantially a geometrically non-polar structure is capable of developing a high torque at synchronous speed.

My invention is equally applicable to other dynamo-electric machines with multiple-pole rotors, and I desire that the accompanying claims shall be construed to cover such modifications as may be within the scope of the language thereof.

I claim as my invention:

1. A multiple-pole member of a dynamo-electric machine comprising core portions severally composed layers of magnetic material of V-shape and alternately layers of non-magnetic but electrically conducting material of similar shape, and means for securing said portions in parallel relation to the axis of said member.

2. A multiple-pole member of a dynamo-electric machine comprising core portions severally composed of angular layers of magnetic material and alternately disposed similar layers of non-magnetic but electrically conducting material, said layers being disposed parallel to the axis of the machine, and means providing electrical connections between the layers at both ends of said member.

3. A synchronous reaction motor comprising a primary member and multiple-pole secondary member, said secondary member comprising core portions severally composed of angular layers of magnetic material, said layers being disposed parallel to the axis of the machine, and means providing electrical connections between the layers at both ends of said member.

4. A synchronous reaction motor having a rotor comprising a shaft, core portions composed of angular layers of magnetic material and angular layers of non-magnetic conducting material and disposed parallel to the shaft, means for securing said core sections to the shaft, and means co-operating with said layers of non-magnetic material to provide a winding for said rotor, said rotor forming substantially a geometrically non-polar structure which acquires a magnetic polarity in a magnetic field rotating in a plane perpendicular to the shaft.

5. A synchronous reaction motor having a stator provided with a winding and a rotor comprising a shaft, magnetic core portions composed of angular layers of magnetic material and alternate layers of non-magnetic but electrically conducting material, means for securing said portions to the shaft and means for providing electrical connections between the layers at both ends of the core, said rotor forming a substantially geometrically non-polar structure capable of self-starting in a magnetic field rotating around the axis of the rotor and developing a magnetic polarity in such field which holds said rotor in synchronism with the field.

6. A synchronous reaction motor having a stator and a substantially cylindrical rotor, said rotor, comprising a supporting body having shaft extensions, core portions composed of alternate angular layers of magnetic material and non-magnetic but electricallly conducting material, secured to said body and means for connecting said layers in closed circuits.

7. A four-pole synchronous reaction motor having a stator provided with a primary winding and a substantially cylindrical rotor comprising a shaft, four adjoining core portions composed of alternate angular layers of magnetic material and non-magnetic but electrically conducting material, and means for securing said core portions to the shaft, said layers being electrically connected at both ends of the core.

8. A four-pole synchronous reaction motor having a stator provided with a primary winding and a substantially cylindrical rotor, said rotor comprising a supporting body, four adjoining core portions composed of alternate angular layers of magnetic material and non-magnetic but electrically conducting material, bolts of non-magnetic material securing said portions to the shaft, and means at both ends of the core for connecting said layers in closed circuits to provide the effect of a squirrel-cage winding.

9. A four-pole synchronous reaction motor having a stator provided with a primary winding and a substantially cylindrical rotor, said rotor comprising a shaft, four adjoining core portions composed of alternate angular layers of magnetic and non-magnetic but electrically conducting material and end plates for securing said portions to the shaft and providing electrical connections between the layers.

10. A multiple-pole member of a dynamo-electric machine comprising core portions severally composed of angular layers of magnetic material and alternately disposed layers of non-magnetic material, said layers being disposed parallel to the axis of the machine, and means providing electrical connections between at least some of the layers at both ends of said member.

In testimony whereof, I have hereunto subscribed my name this 13th day of November, 1922.

JOSEPH SLEPIAN.